July 22, 1969  C. F. GOTTZMANN ET AL  3,456,595
CRYOGENIC LIQUID METERING PUMP
Filed Sept. 20, 1966  2 Sheets-Sheet 1

INVENTORS.
CHRISTIAN F. GOTTZMANN
JAMES A. HALLORAN
FRED A. WILSON
BY Barnwell R. King
ATTORNEY

United States Patent Office 3,456,595
Patented July 22, 1969

3,456,595
CRYOGENIC LIQUID METERING PUMP
Christian F. Gottzmann, Clarence, James A. Halloran, North Tonawanda, and Fred A. Wilson, Kenmore, N.Y., assignors to Union Carbide Corporation, a corporation of New York
Filed Sept. 20, 1966, Ser. No. 580,787
Int. Cl. F04b *21/04*
U.S. Cl. 103—203                                  3 Claims

ABSTRACT OF THE DISCLOSURE

A pump adapted to pump a metered quantity of vaporizable cryogenic fluid. The pump comprises a reciprocating piston operated in a vented cylinder by a reciprocating rod. A meter is connected to the rod to measure a cumulative quantity of cryogenic fluid delivered by the pump.

---

Figure 1:
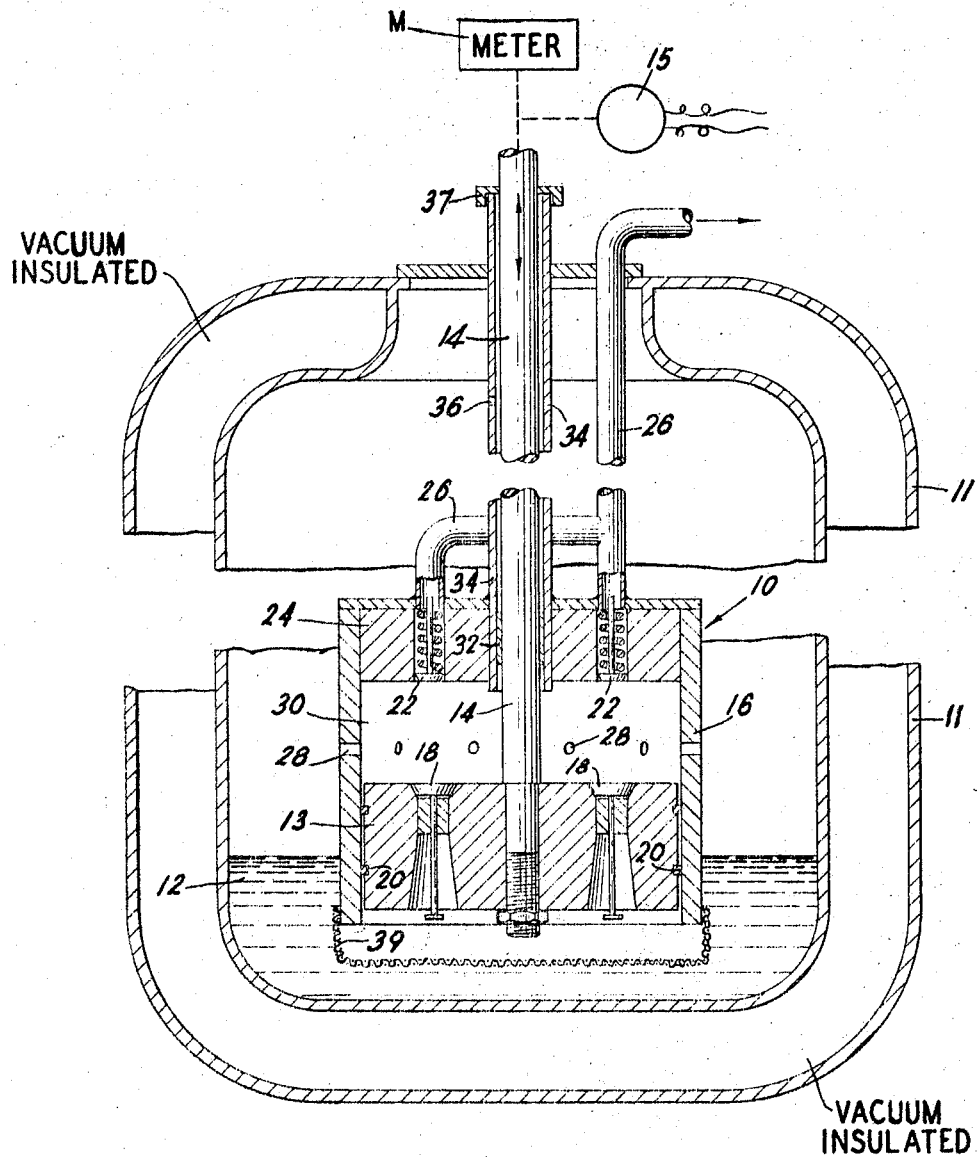

This invention relates to metering pumps, and more particularly to apparatus for the metered delivery of cryogenic liquid from a cryogenic fluid source.

It is desirable to meter directly the quantity of vaporizable cryogenic liquid being delivered by a pump. Such can be accomplished most conveniently and accurately by adapting a reciprocating type pump to perform both the pumping and metering functions, thus eliminating the added complexity and operation problems associated with a separate flow meter. In adapting such a pump to perform accurately as a flow metering device, the volumetric efficiency of the pump must be fixed within relatively close limits at a known value attainable under virtually all operation conditions to be encountered in normal service.

According to this invention, the volumetric efficiency of a reciprocating positive displacement pump handling vaporizable cryogenic liquid is established and maintained within acceptably close limits by providing auxiliary venting passages within the pumping chamber. Such auxiliary passages are located and sized so as to vent at least the vapor portion at an intermediate pressure level less than that required to open the pump discharge valves, and release a predetermined portion of the fluid within the cylinder back to the pump suction.

The remaining portion of fluid is forced through the pump discharge valve as liquid, thus achieving a substantially fixed volumetric efficiency which is independent of varying suction conditions of the pump, and permitting the number of pump strokes to be used for cryogenic liquid delivery metering purposes. Thus, this invention successfully combines into one device the pumping and metering of cryogenic liquids. While this pump is useful for handling any easily vaporizable cryogenic liquid, it is particularly useful for liquid nitrogen. It is quite useful in dispensing cryogenic liquid at moderate pressures (up to 200 lb./sq. in.).

Figure 2:
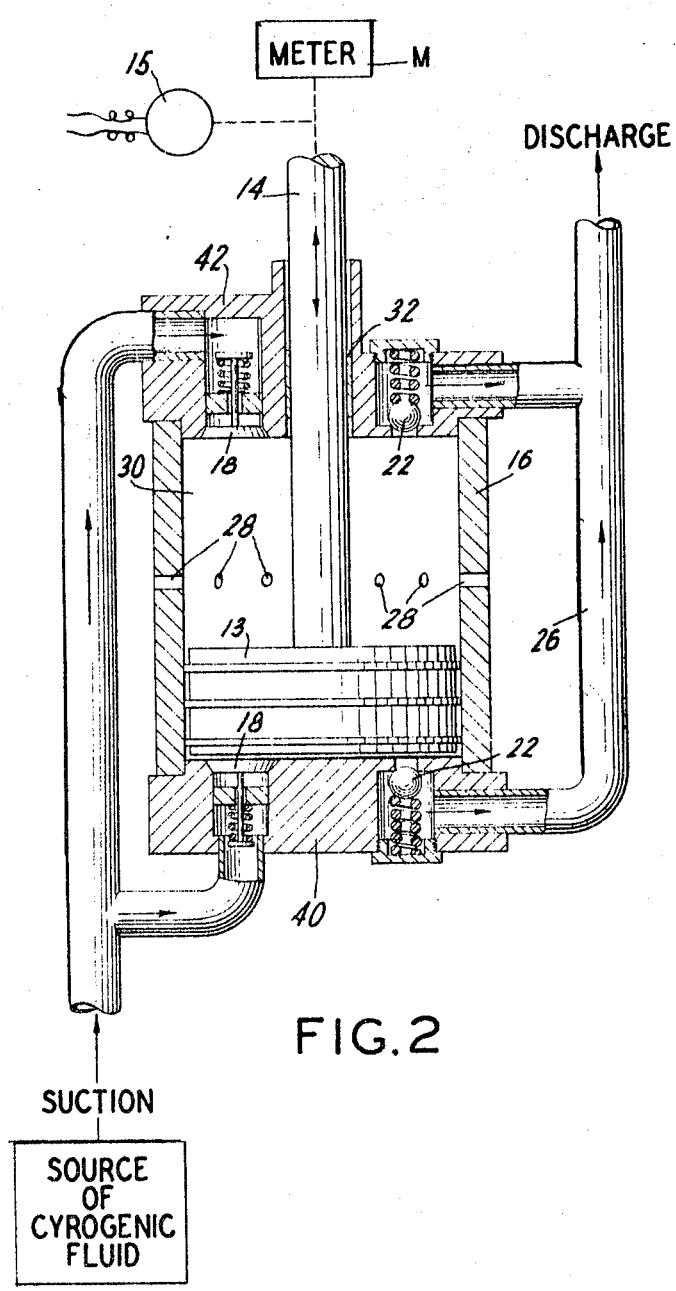

In the drawings:

FIGURE 1 is a fragmentary view in vertical cross section of a pump illustrative of the invention; and FIGURE 2 is a similar view showing a modification of the invention.

As shown in FIGURE 1, a reciprocating pump assembly 10 is installed within an insulated enclosure 11 containing easily-vaporized cryogenic fluid 12. Pump assembly 10 comprises a piston 13 carried on rod 14, and sliding within cylinder 16. The rod is reciprocated by a motor 15. Piston 13 contains suction valve 18, which is preferably annular shaped, and also utilizes one or more seal rings 20 around the piston to prevent fluid blow-by. Two or more discharge valves 22 are symmetrically located in upper cylinder head 24 through which the pressurized fluid passes into discharge conduit 26 and thence to consuming means. Vent holes 28 are positioned in the cylinder wall 16 just above the piston surface as shown. The pump rod is connected to meter M for cryogenic liquid flow measurement.

The pump piston 13 is guided within cylinder 16 by bushings 32 located within extension tube 34 near its lower end. Such construction permits seal rings only to be used around piston 13 (no guide bushings required), so that its thickness and mass may be thereby reduced to a desirable minimum. Bushings 32 also serves to substantially seal the discharge pressure of the pump, except that pressure relief hole 36 is located near the upper end of the extension so that rod packing 37 is required to seal against a reduced pressure and not against the full discharge pressure of the pump. If desired, a screen 39 may be used on the suction end of the pump to prevent foreign material from entering the pumping chamber.

An important feature of this invention is the location of vent passage 28 relative to the top surface of the piston 13 and the pump stroke. For best results, the location of passages 28 above the piston upper surface should be at 10–30 percent of the pump stroke, depending upon suction conditions for the particular pump. Also, in order to provide minimum pump clearance volume, the upper surface of the piston should match closely the shape of the upper head of the pumping chamber, and will preferably be made flat for reasons of economical manufacturing. Likewise, discharge valves 22 should preferably seat very near the piston upper surface so as to reduce the pump clearance to a minimum and thus increase the pump volumetric efficiency. While ball type discharge valves could be used, flat valves are preferred for reasons of providing minimum pump clearance volume.

Because of the substantially constant volumetric efficiency of this pump over a wide range of operation conditions, the quantity of liquid delivered is proportional to the number of pump strokes. Thus, a revolution counter calibrated in convenient units such as cubic feet or gallons can be connected to the pump rod or similar moving part and used to indicate the quantity of liquid delivered. Also, for a constant speed pump drive, the cryogenic liquid delivered is proportional to time. Thus, if desired, a timer calibrated in suitable units may be used to indicate the quantity of product delivered. Since constant speed motor drive will usually be used on the pump, the timer is preferred to indicate the product quantity delivered.

The operation of the pump is explained below with the piston starting at near bottom dead center as shown in FIGURE 1. Fluid 12 has been forced into pumping chamber 30 through suction valves 18 during the preceding downward suction stroke of the plunger, so that the pumping chamber contains a two-phase mixture of liquid and vapor. Then as the piston 13 moves upward, such fluid is initially pressurized sufficiently to collapse to vapor bubbles but without opening spring-loaded discharge valves 22. This initial movement of the piston and the pressure increase within the pumping chamber 30 forces a portion of the fluid out of the small passages 28, and back to suction. As the piston 13 rises further, it covers vent passages 28 and thereby seals them. The remaining fluid in the pumping chamber is compressed to delivery system pressure, and the cryogenic liquid passes out through the discharge valves 22 and conduit 26.

The location and sizing of the vent passages 28 within the pump chamber is quite important for achieving a desired volumetric efficiency for the pump. The optimum volumetric efficiency is that efficiency which can be achieved consistently under the lowest NPSH (net positive suction head) condition expected to be encountered during normal service with a similar but unvented pump, such as at low container static pressure and low liquid levels. The first step is to determine the location of the vent passages relative to the piston or as a percent of pump stroke. The passage location as a percentage of pump stroke is substantially equal numerically to the selected volumetric efficiency.

Following the locating of the vent passages in the cylinder wall, the total area of vent passage required to discharge the excess fluid portion is determined. Using a plot of piston velocity vs. percent stroke for the pump drive being used, the piston velocity corresponding to the desired percent of pump stroke is then determined. This piston velocity in combination with the pump displacement volume establishes the required flow rate for the fluid being vented. Next, the allowable pressure drop across the vent passages for discharging the pump's full liquid capacity at the established flow rate (without the pump discharge valves being opened) is determined. The allowable pressure drop across the vent passages is the pressure increase in the pumping cylinder necessary to collapse the bubbles in the two-phase fluid, and is determined by the combination of the adiabatic pressurization and the decreasing cylinder volume. The total vent area should be sufficient to pass this fluid flow at the allowable pressure drop. Thus, the location and sizing of the vent passages are also related to the pressure drop across the suction valves. For increased pressure drop across the suction valves, the vent passages should be located at a greater percentage of pump stroke and also made slightly larger.

After establishing the required vent passage area, this area is provided by a plurality of passages evenly distributed around the circumference of the cylinder. The maximum allowable width of these passages is determined by the beam strength of the piston rings 20 across the vent opening, so that the portion of the ring covering the passage will not deflect into the vent passage and thus increase wear on the rings. Although the individual passages may be any shape, they are preferably made round for reasons of convenience of manufacture and flow calculations (round orifices being simpler to calculate for size).

While this preferred cryogenic liquid pump-meter was specifically developed for the vertical uplift type pump action having suction valves in the piston as described above and illustrated by FIGURE 1, it may also be used for such pumps in horizontal position. Furthermore, it may be used for other type reciprocating pumps in either vertical or horizontal position, such as those having suction valves in the pump body and in which fluid is discharged on the "down" stroke, e.g., as covered by U.S. Patent Nos. 3,016,717 and 3,136,136.

Also, the invention is applicable to a double-acting reciprocating pump arrangement, as illustrated by FIGURE 2. A common set of auxiliary vent passages 28 are provided to discharge excess fluid on both the up-stroke and the down-stroke of piston 13. Suction and discharge valves 18 and 22 are located in the end walls 40 and 42, as shown.

The effective location of the vent passages relative to the adjacent piston surface may be varied for a particular pump by substituting pistons of varying thicknesses. Furthermore, if desired, the location of the vent passage relative to the adjacent piston end may be made different for the two ends of the pump by adjusting the location of the piston within the cylinder. Although the FIGURE 2 arrangement would usually require somewhat greater NPSH than the FIGURE 1 arrangement and consequently have lower volumetric efficiency per stroke (because motion of the piston does not assist in filling the cylinder), this disadvantage is probaly more than offset by the double acting feature providing two strokes per revolution.

What is claimed is:

1. A cryogenic liquid pump for delivery of metered cryogenic liquid, which comprises a cylindrical wall providing a piston chamber having cryogenic gas vent passages located between the opposite ends thereof, a piston adapted to reciprocate in such chamber so as to close and open such vents, means providing a cryogenic fluid inlet passage containing a suction valve connected to such chamber so that said piston draws cryogenic fluid into such chamber on a selected stroke thereof, means providing a cryogenic liquid outlet passage containing a spring loaded cryogenic liquid discharge valve connected to such chamber so that said piston discharges cryogenic liquid from such chamber on the subsequent cryogenic fluid discharge stroke of the piston only after cryogenic gas is first discharged through such vent passages which are then closed by the piston as the latter continues on such stroke, means containing a source of cryogenic fluid in communication with such inlet passage, means for operating said piston including a rod connected to said piston, and a meter connected to said rod and calibrated to indicate the cumulative quantity of cryogenic liquid delivered by the pump through such outlet passage at a relatively fixed volumetric efficiency even at relatively low suction pressures.

2. A pump as defined by claim 1, in which the suction valve is located in the piston.

3. A pump as defined by claim 1, in which the piston is double-acting with a single set of vent passages located in the cylinder wall.

References Cited

UNITED STATES PATENTS

| | | | |
|---|---|---|---|
| 814,883 | 3/1906 | Starr | 103—203 |
| 2,026,132 | 12/1935 | Klein | 103—203 |
| 2,054,710 | 9/1936 | Okada | 103—203 |
| 2,730,957 | 1/1956 | Riede. | |
| 2,837,239 | 6/1958 | Scholin | 222—41 |

ROBERT M. WALKER, Primary Examiner